US008060350B2

(12) United States Patent
Silva

(10) Patent No.: US 8,060,350 B2
(45) Date of Patent: Nov. 15, 2011

(54) METHOD OF PERFORMING COMPUTATIONAL AEROELASTIC ANALYSES

(75) Inventor: Walter A. Silva, Williamsburg, VA (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 707 days.

(21) Appl. No.: 12/056,686

(22) Filed: Mar. 27, 2008

(65) Prior Publication Data

US 2008/0243448 A1    Oct. 2, 2008

Related U.S. Application Data

(60) Provisional application No. 60/908,769, filed on Mar. 29, 2007.

(51) Int. Cl.
*G06F 7/60* (2006.01)
(52) U.S. Cl. ............. 703/2; 703/1; 700/29; 702/56
(58) Field of Classification Search .......... 703/1, 2, 703/6, 7, 8; 700/29; 702/179
See application file for complete search history.

(56) References Cited

U.S. PATENT DOCUMENTS

| | | | | |
|---|---|---|---|---|
| 4,475,385 A | * | 10/1984 | Farmer | 73/147 |
| 5,199,856 A | * | 4/1993 | Epstein et al. | 417/312 |
| 5,374,011 A | * | 12/1994 | Lazarus et al. | 244/99.8 |
| 5,819,188 A | | 10/1998 | Vos | |
| 5,926,399 A | * | 7/1999 | Berkooz et al. | 703/7 |
| 6,125,333 A | | 9/2000 | Pun | |
| 6,216,063 B1 | | 4/2001 | Lind et al. | |
| 6,526,550 B1 | | 2/2003 | Badding et al. | |
| 6,959,269 B1 | | 10/2005 | Welterlen | |
| 7,054,785 B2 | | 5/2006 | Goodman | |
| 7,131,611 B2 | * | 11/2006 | Ferman | 244/39 |
| 7,206,709 B2 | * | 4/2007 | Griffin et al. | 702/85 |
| 2004/0267497 A1 | | 12/2004 | Goodman | |
| 2005/0234839 A1 | | 10/2005 | Haudrich | |
| 2006/0025973 A1 | | 2/2006 | Kim | |
| 2009/0099796 A1 | * | 4/2009 | Yang et al. | 702/56 |

OTHER PUBLICATIONS

Lin et al, Decoupled Fuzzy Sliding-Mode Control of a Nonlinear Aeroelastic Structure, Proceedings of the 2002 IEEE International Conference on Fuzzy Systems, 2002, pp. 662-667.*
Raveh, Computational-Fluid-Dynamics-Based Aeroelastic Analysis and Structural Design, Computer Methods in Applied Mechanics and Engineering, vol. 194, No. 30-33, 2005, pp. 3453-3471.*
Jer-Nan Juang et al., "An Eigensystem Realization Algorithm for Modal Parameter Identification and Model Reduction," Journal of Guidance, Control, and Dynamics, (vol. 8), (p. 620-627), (1985).

* cited by examiner

*Primary Examiner* — Russell Frejd
(74) *Attorney, Agent, or Firm* — Robin W. Edwards

(57) ABSTRACT

Computational aeroelastic analyses typically use a mathematical model for the structural modes of a flexible structure and a nonlinear aerodynamic model that can generate a plurality of unsteady aerodynamic responses based on the structural modes for conditions defining an aerodynamic condition of the flexible structure. In the present invention, a linear state-space model is generated using a single execution of the nonlinear aerodynamic model for all of the structural modes where a family of orthogonal functions is used as the inputs. Then, static and dynamic aeroelastic solutions are generated using computational interaction between the mathematical model and the linear state-space model for a plurality of periodic points in time.

27 Claims, 6 Drawing Sheets

(KNOWN ART)

METHOD OF PERFORMING COMPUTATIONAL AEROELASTIC ANALYSES

Pursuant to 35 U.S.C. §119, the benefit of priority from provisional application 60/908,769, with a filing date of Mar. 29, 2007, is claimed for this non-provisional application.

ORIGIN OF THE INVENTION

This invention was made by an employee of the United States Government and may be manufactured and used by or for the Government of the United States of America for governmental purposes without the payment of any royalties thereon or therefor.

BACKGROUND OF THE INVENTION

1. Field of the Invention

This invention relates to computational aeroelastic analyses. More specifically, the invention is a method for performing computational aeroelastic analyses using linear state-space models.

2. Description of the Related Art

When designing aerodynamic structures, it is important to understand if and under what aerodynamic conditions the structure will be stable and unstable. This is especially true if a structure is inherently flexible (e.g., a wing) such that unstable operation thereof leads to oscillations of the structure until failure occurs. Accordingly, the field of aeroelastics examines the interaction between a flexible structure and the unsteady aerodynamics generated by the structure. Since structure design generally includes performance predictions, it is necessary to predict the aeroelasticity of a particular design. To do this, computational aeroelastic methods are used to numerically simulate an aeroelastic process using computational techniques. In general, the computational techniques include the use of a mathematical model of the structure and an aerodynamic model of aerodynamic conditions of the structure.

Referring now to FIG. 1, traditional computational aeroelastic analyses use Computational Fluid Dynamics (CFD) codes that require the coupled feedback interaction of a linear structural model 10 and a nonlinear aerodynamic model 20 (i.e., the CFD code). This coupled feedback interaction consists of information 12 (e.g., structural modes such as displacements or deflections in the case of flexible structures) from structural model 10 being passed to nonlinear aerodynamic model 20. For a flexible aerodynamic structure such as a wing, information 12 from structural model 10 consists of the physical displacements of the structure due to an aerodynamic force. This physical displacement information is supplied to nonlinear aerodynamic model 20 in order to compute an aerodynamic response or force 22 induced by this structural displacement. The computed aerodynamic response 22 is then fed back to structural model 10 to compute new displacement information 12. This exchange of information repeats at each time step of a numerical solution and this coupled feedback interaction takes place wholly within the aeroelastic CFD code.

Nonlinear aerodynamic model 20 is significantly more complicated than linear structural model 10. Therefore, the computational efficiency of the coupled feedback interaction process is driven by the large computational expense of the nonlinear aerodynamic system defined by the CFD code. As a result, traditional computational aeroelastic analyses are very time-consuming and computationally expensive. The output from the repetitive feedback process described above are time histories of the response of the structure at a given flight condition. The output time histories indicate the level of stability (or instability) of the structure's configuration being analyzed at a given flight condition. Stability (instability) is determined by the convergence (divergence) of the time histories. By changing the flight condition and repeating this analysis as necessary, the region of the flight envelope where the configuration is safe (stable) or unsafe (unstable) is defined. Clearly, computation of the stability/instability boundary (i.e., also known as flutter) becomes very expensive and time-consuming since the above-mentioned process must be repeated at several conditions.

In addition, the output time histories are in a form that is not suitable for use by other structure-design disciplines such as controls or optimization. These disciplines have a very specific requirement for the types of mathematical models that can be analyzed. However, the output time histories from the traditional computational aeroelastic analyses are not in that form. Thus, the value of the information generated by traditional computational aeroelastic analyses is limited in that it cannot be readily utilized by other disciplines involved in the overall vehicle design process.

SUMMARY OF THE INVENTION

Accordingly, it is an object of the present invention to provide a method of performing computational aeroelastic analyses.

Another object of the present invention is to provide a computationally-efficient method of performing aeroelastic analyses that reduces the amount of time it takes to generate an aeroelastic solution.

Still another object of the present invention is to provide a method of performing aeroelastic analyses in order to generate an aeroelastic solution that is in a form suitable for use by other disciplines in the aerodynamic structure design process.

Other objects and advantages of the present invention will become more obvious hereinafter in the specification and drawings.

In accordance with the present invention, a method is provided for performing aeroelastic analyses. The method uses a mathematical model for a plurality of structural modes of a flexible structure, and a nonlinear aerodynamic model that can generate a plurality of unsteady aerodynamic responses based on the structural modes for conditions defining an aerodynamic condition of the flexible structure. A linear state-space model is generated using a single execution of the nonlinear aerodynamic model for all of the structural modes. This single execution of the nonlinear aerodynamic model is carried out using a family of orthogonal functions as inputs thereto. Then, static and dynamic aeroelastic solutions are generated using computational interaction between the mathematical model and the linear state-space model for a plurality of periodic points in time.

DETAILED DESCRIPTION OF THE INVENTION

Figure 1:
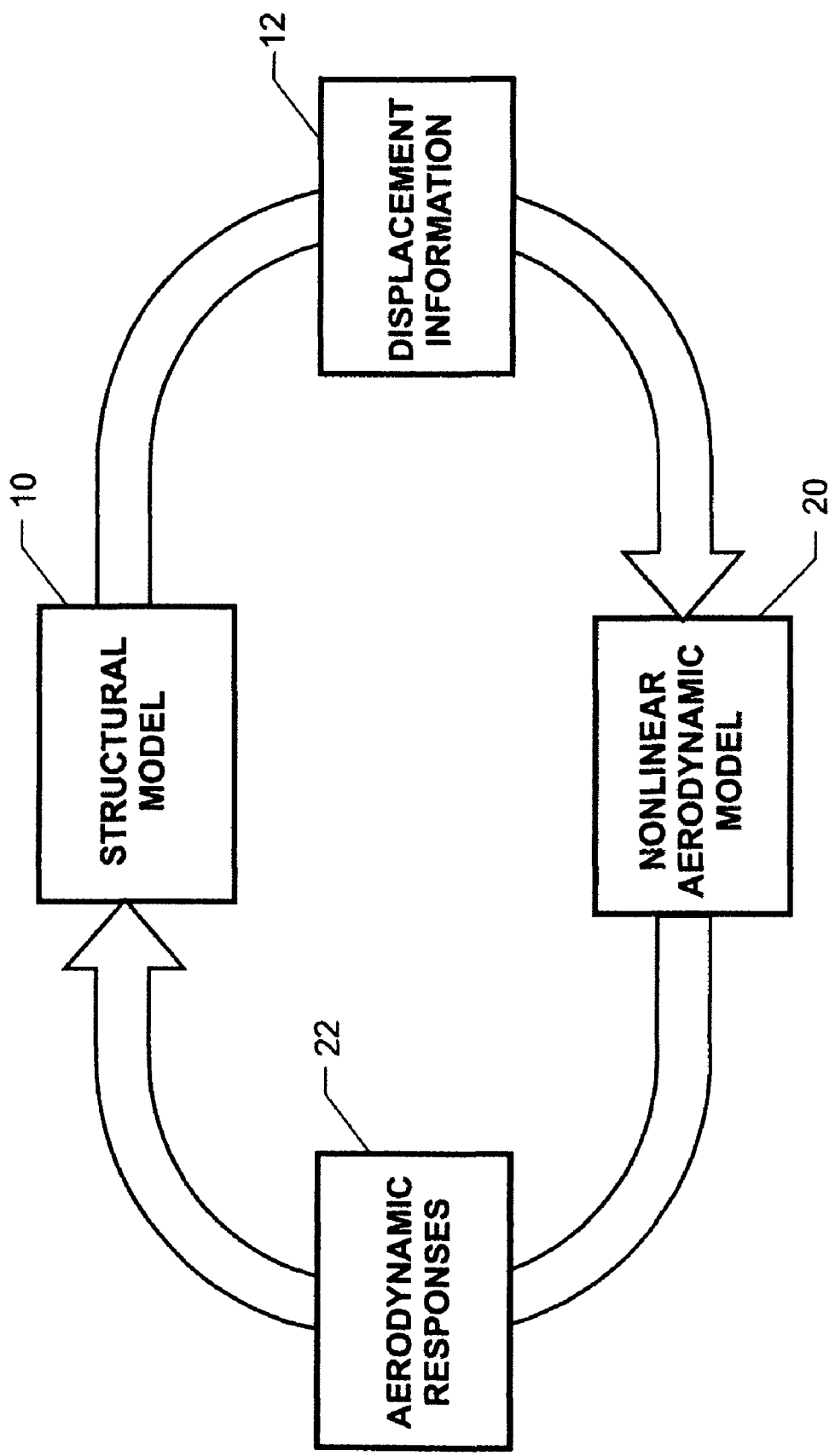
FIG. 1 is a simplified graphic depiction of a conventional computational aeroelastic process for a flexible structure.
Figure 2:
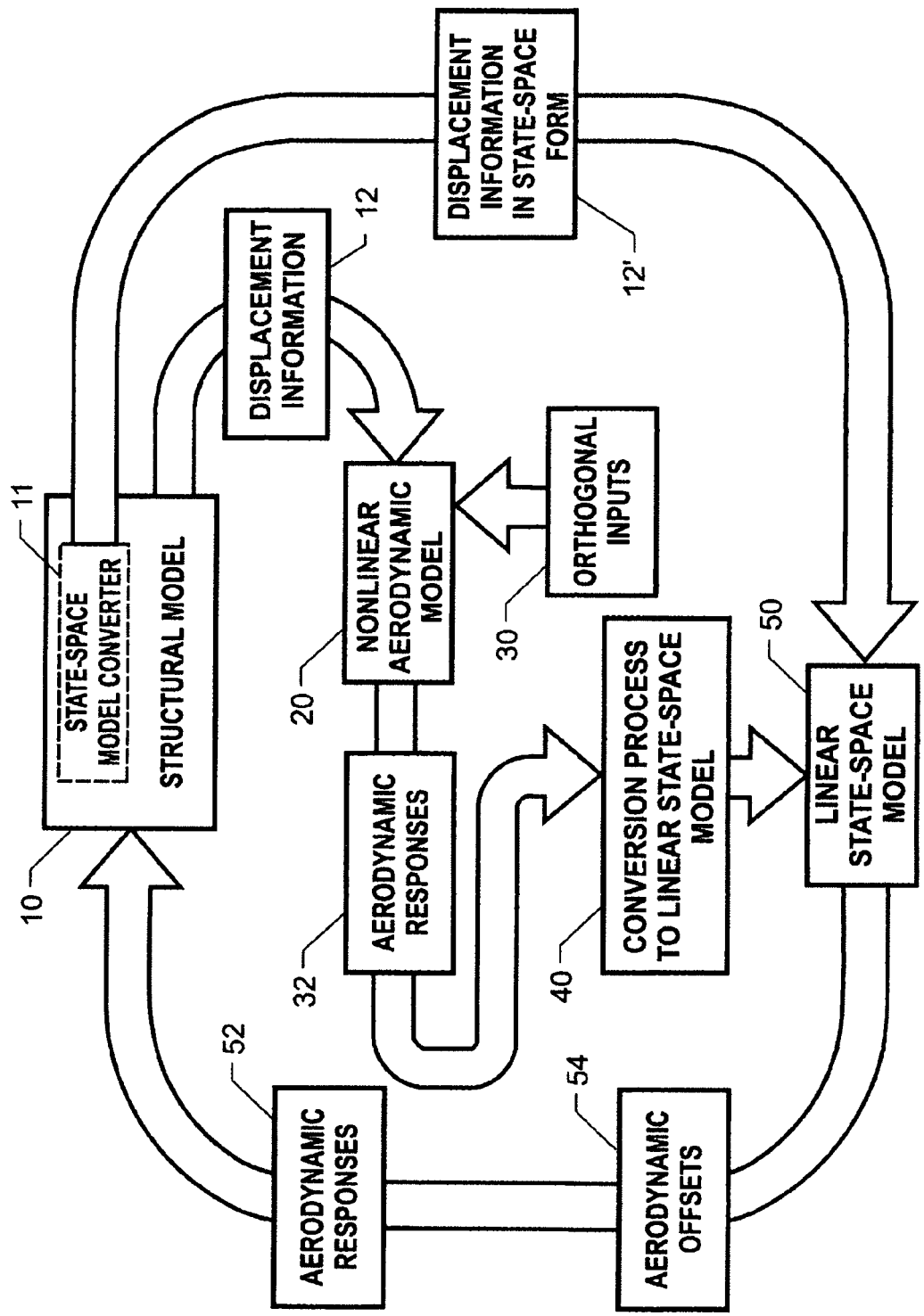
FIG. 2 is a graphic depiction of a method of performing computational aeroelastic analyses for a flexible structure in accordance with an embodiment of the present invention.

Referring again to the drawings and more particularly to FIG. 2, a method of performing computational aeroelastic analyses in accordance with an embodiment of the present invention is illustrated graphically. The attributes of this novel method that are the same as the traditional method (FIG. 1) will be referred to using common reference numerals. This new method can be applied to any flexible structure that can be modeled in terms of its various structural modes or displacement characteristics. For example, the present invention can be used to perform computational aeroelastic analyses on a variety of flexible aerodynamic structures such as wings, fuselages, and tail components.

Similar to traditional computational aeroelastic analyses methods, the present invention uses a structural model 10 that is a mathematical model describing the various structural modes for a flexible structure of interest. More specifically, structural model 10 provides an aeroelastic model that can be used within and by the analyses' aerodynamic model. For example, if the aerodynamic model is a "computational fluid dynamics" (CFD) code, structural model 10 will include a CFD grid and structural mode shape information as is known in the art. During any given time step of the process illustrated in FIG. 2, structural model 10 presents displacement information 12 that describes a structural mode shape in terms of the CFD grid.

In accordance with the present invention, all of the structural modes defined by structural model 10 are initially provided to a nonlinear aerodynamic model 20 that can be (and typically is) a CFD code. A well known and proven example of a CFD code is the CFL3D code developed by the National Aeronautics and Space Administration (NASA). This CFD code is available from NASA Langley Research Center, Hampton, Va.

Figure 3:
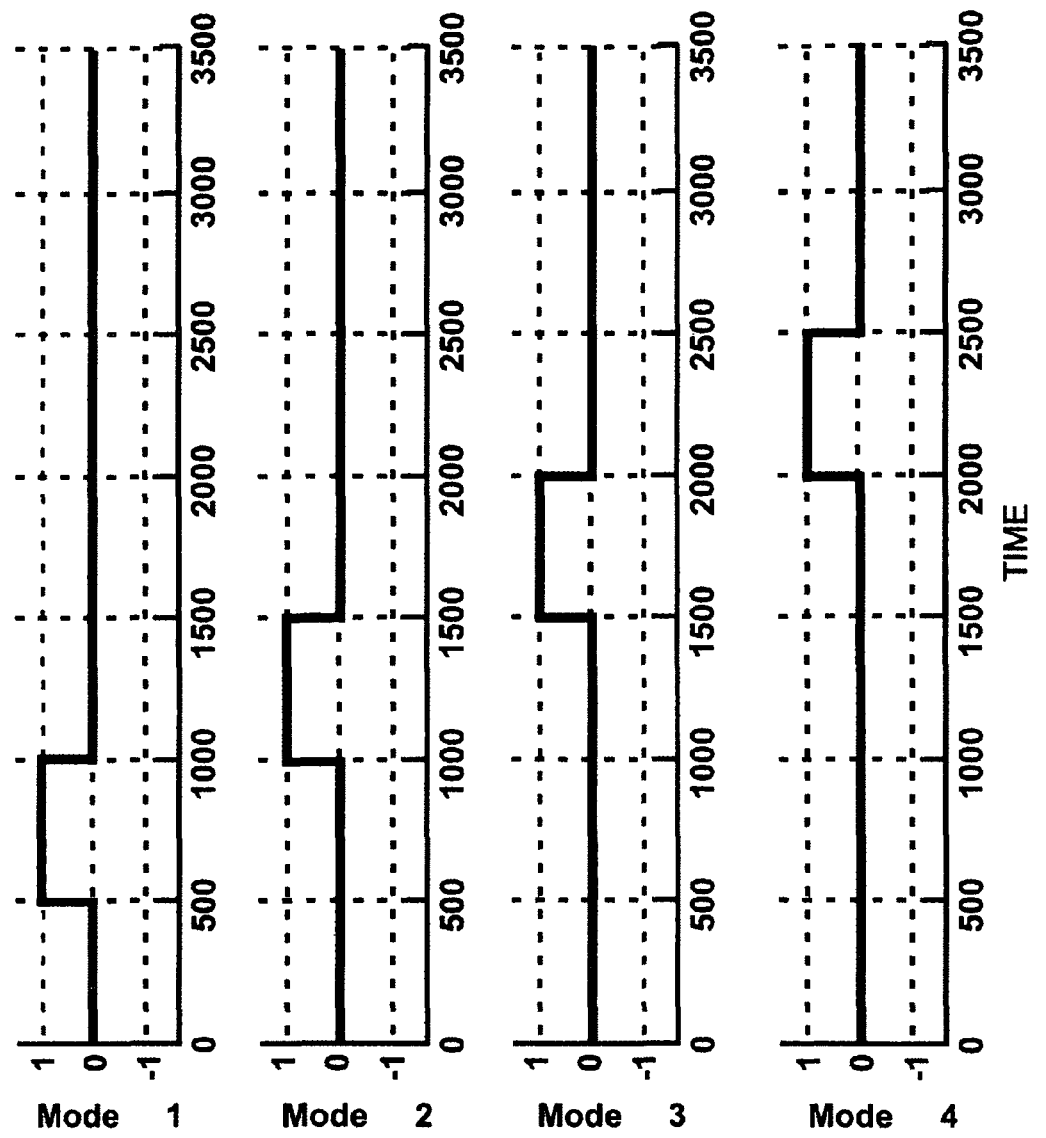
FIG. 3 illustrates a set of orthogonal block pulse functions.
Figure 4:
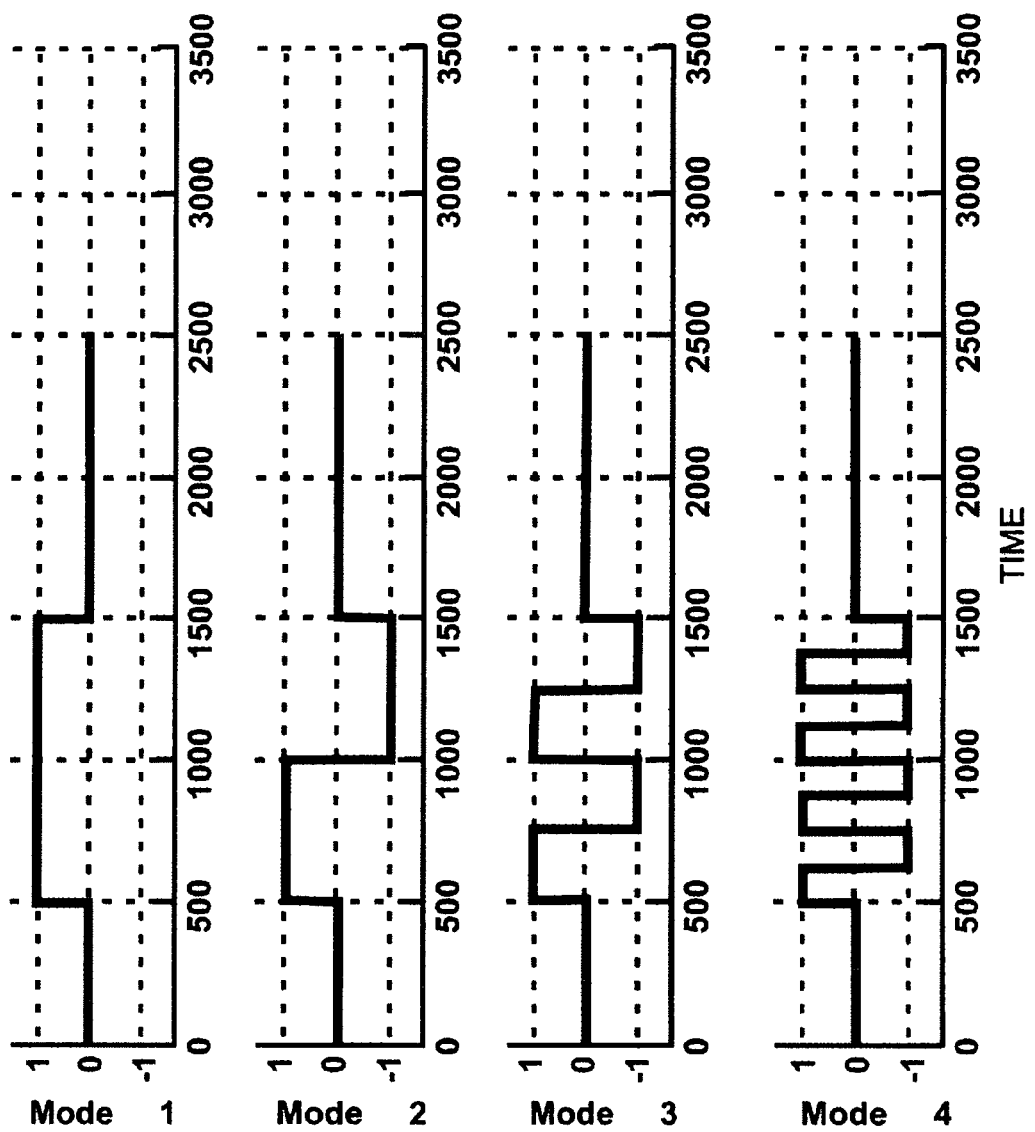
FIG. 4 illustrates a set of orthogonal Haar functions.
Figure 5:
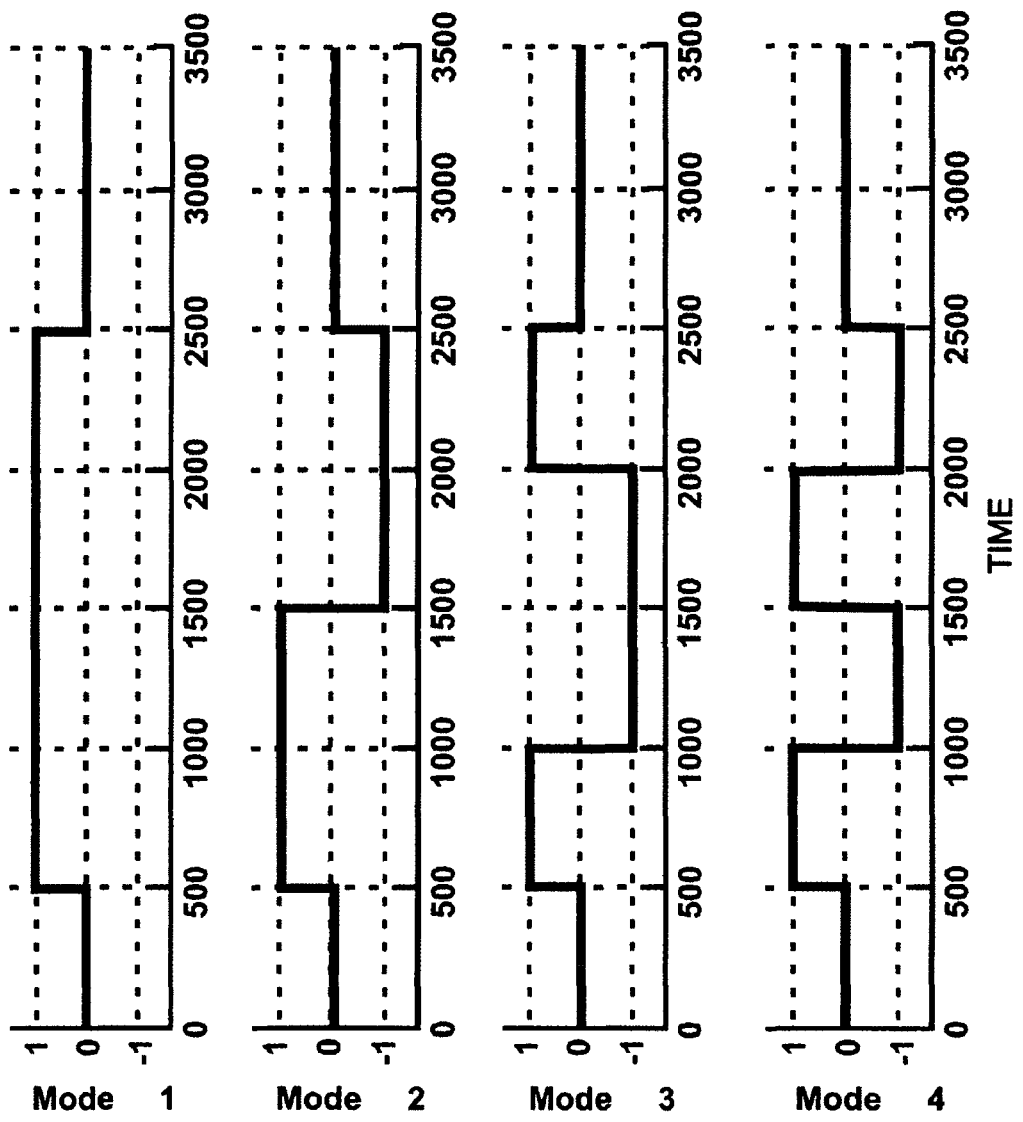
FIG. 5 illustrates a set of orthogonal Walsh functions.

The present invention requires and performs only a single execution of model 20 for all of the structural modes of structural model 10. All of the structural modes are excited simultaneously using inputs that are defined by a family of orthogonal functions 30. From a mathematical perspective, two functions are considered to be orthogonal when the waveforms or signals associated therewith are as different or independent from one another as possible. Three types of functions that can be used in the present invention are the known block pulse functions, Haar functions and Walsh functions. By way of example, FIG. 3 illustrates a set of four block pulse functions (that would be used to solve a four input problem), FIG. 4 illustrates a set of four Haar functions, and FIG. 5 illustrates a set of four Walsh functions.

The single execution of model 20 for all of the structural modes of model 10 using orthogonal inputs 30 produces unsteady aerodynamic responses 32 for all of the structural modes simultaneously. Responses 32 are provided to a conversion process 40 that transforms responses 32 to a linear model 50 in state-space form. The state-space form is a well-known reduced-order model form that is also used by other aerodynamic design disciplines to include the controls and optimization disciplines. In the present invention, linear state-space model 50 is a simplified mathematical model that represents unsteady aerodynamic responses 32 extracted from nonlinear aerodynamic model 20. In other words, state-space model 50 has the characteristics of nonlinear aerodynamic model 20. However, by its very nature, linear state-space model 50 generated by conversion process 40 is significantly less complex than nonlinear aerodynamic model 20.

Conversion process 40 can be implemented using a variety of routines known to those skilled in the art. For example conversion process 40 can be realized using the Eigensystem Realization Algorithm (ERA). See Juang et al., "An Eigensystem Realization Algorithm for Model Parameter Identification and Model Reduction," Journal of Guidance, Control, and Dynamics, Vol. 8, 1985, pp. 620-627. In terms of executable computer code, the ERA is a subroutine of the MATLAB software package available commercially from The Math Works, Inc., Natick, Mass. Briefly, the ERA is a routine used to create a linear math model of a system if the inputs and corresponding outputs of the system are known.

The present invention next applies the traditional computational feedback interaction process using structural model 10 and linear state-space model 50 in order to generate static and dynamic aeroelastic solutions. A well known platform/ environment for carrying out this process is the MATLAB/ SIMULINK environment, also available commercially from The Math Works, Inc. It is to be understood that other software tools could also be used to carry out the feedback process without departing from the scope of the present invention. Since the MATLAB/SIMULINK environment uses the mathematical state-space definition of systems to perform simulations and analyses, it is a good choice to use with linear state-space model 50. This feedback process is illustrated in FIG. 2 by the outermost "circle" of events. As would be understood in the art, this feedback process runs over a plurality of time steps to arrive at aeroelastic solutions.

Referring still to FIG. 2, structural model 10 should be in a state-space form in order to be compatible with linear state-space model 50. If structural model 10 is not in state-space form, it is necessary to apply a state-space form converter 11 to structural model 10. Methods for putting structural model 10 in a state-space form are well known in the art. The resulting displacement information 12' in state-space form is passed to linear state-space model 50.

The linear nature of both displacement information 121 and model 50 allows the resulting aeroelastic responses 52 to be generated much faster than an execution of nonlinear aerodynamic model 20. Aeroelastic responses 52 are then passed to structural model 10 where the process repeats itself. As mentioned above, the process repeats for a number of time steps until the resulting static and dynamic aeroelastic solutions indicate system stability or instability. Solution times are greatly reduced in the present invention as substantial computational efficiencies result from using linear state-space model 50. At the same time, since linear state-space model 50 captures the essence of the computationally-inefficient nonlinear aerodynamic model 20, results generated by the present invention are similar to those generated by the traditional computational feedback interaction process that relies solely on nonlinear aerodynamic model 20. Furthermore, the resulting aeroelastic solutions are in state-space form and are, therefore, in a form that is readily usable by other aerodynamic control disciplines.

The computational speed/efficiency of the present invention can be further enhanced by the provision of predetermined aerodynamic offsets 54. Offsets 54 are predetermined values indicative of an aerodynamic load that would result if the structure of interest were a rigid body. In other words, offsets 54 essentially define the aerodynamic load on a rigid or non-flexible embodiment of the structure. The determination of such offsets/values is well understood in the art. By starting the feedback process with rigid aerodynamic load values, the actual aeroelastic (i.e., flexible structure) static response solution will be representative of the true physical deformation of the structure. Often, in an aeroelastic analysis process, either static aeroelastic solutions or static plus dynamic aeroelastic solutions are desired. Due to the innovation of using the rigid aerodynamic offsets, the present invention can be used to provide either static aeroelastic solutions or static plus dynamic aeroelastic solutions. This is a new capability for aeroelastic analyses using state-space models.

Figure 6:
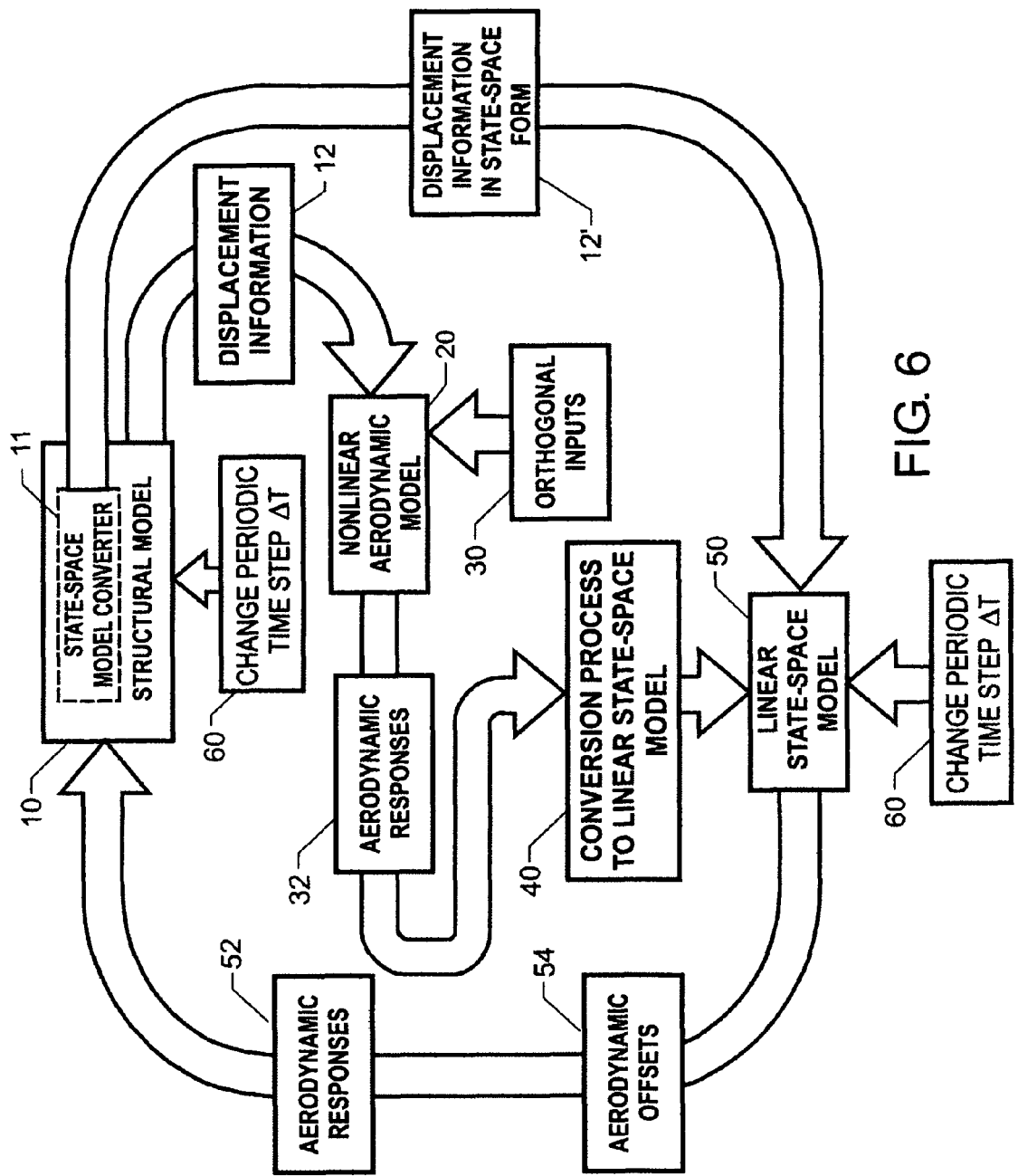
FIG. 6 is a graphic depiction of a method of performing computational aeroelastic analyses in accordance with another embodiment of the present invention.

The present invention also provides the basis for additional computational advantages. In particular, the present invention can be expanded to provide what are known as matched-point solutions, i.e., new aeroelastic solutions for changes in velocity. To do this, the above-described process is repeated for different time step spacings or periods. More specifically and with reference to FIG. 6, after the above-described process is used to generate aeroelastic solutions for a given time step period $\Delta t_1$, the time step period $\Delta t$ is changed at 60 and a new aeroelastic solution set is generated by the outermost "circle" of events described above. Note that the time step must be changed for both linear state-space model 50 and the state-space form of structural model 10 since both models must run in the same time step. Thus, the present invention can also be used to generate matched-point solution sets with only a single execution of nonlinear aerodynamic model 20.

Additional discussion of the present invention is provided in Walter A. Silva, "Simultaneous Excitation of Multiple-Input Multiple-Output CFD-Based Unsteady Aerodynamic Systems," 48th AIAA/ASME/ASCE/AHS/ASC Structures, Structural Dynamics, and Materials Conference, AIAA 2007-1988; and Walter A. Silva, "Recent Enhancements to the Development of CFD-Based Aeroelastic Reduced-Order Models," 48th AIAA/ASME/ASCE/AHS/ASC Structures, Structural Dynamics, and materials Conference, AIAA 2007-2051, both herein incorporated by reference in their entirety.

The advantages of the present invention are numerous. The time required to generate static and dynamic aeroelastic solutions to computational aeroelastic analyses is drastically reduced from hours/days to minutes/hours. The generated aeroelastic solutions are in a state-space form that is compatible with the form of data used by other aerodynamic design disciplines, thereby making the overall aerodynamic design process more efficient when the present invention is used therewith.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of performing aeroelastic analyses, comprising the steps of:
   providing a mathematical model for a plurality of structural modes of a flexible structure;
   providing a nonlinear aerodynamic model for generating a plurality of unsteady aerodynamic responses based on said plurality of structural modes for conditions defining an aerodynamic condition of said flexible structure;
   performing a single execution of said nonlinear aerodynamic model for said plurality of structural modes using a family of orthogonal functions as inputs thereto;
   converting said plurality of unsteady aerodynamic responses generated during said step of performing to a linear state-space model; and
   generating static and dynamic aeroelastic solutions using computational interaction between said mathematical model and said linear state-space model for a plurality of periodic points in time.

2. A method of performing aeroelastic analyses according to claim 1, wherein said generation of static and dynamic aeroelastic solutions comprises rigid aerodynamic offsets.

3. A method of performing aeroelastic analyses according to claim 1, further comprising the steps of:
   changing a period for said plurality of periodic points in time; and
   regenerating static and dynamic aeroelastic solutions using computational interaction between said mathematical model and said linear state-space model for said plurality of periodic points in time so-changed in terms of said period thereof.

4. A method of performing aeroelastic analyses according to claim 1, wherein said family of orthogonal functions is selected from the group consisting of block pulse functions, Haar functions, and Walsh functions.

5. A method of performing aeroelastic analyses according to claim 1, wherein said nonlinear aerodynamic model is a computational fluid dynamics code.

6. A method of performing aeroelastic analyses according to claim 1, wherein said step of converting is performed using an Eigensystem Realization Algorithm.

7. A method of performing aeroelastic analyses according to claim 1, wherein said computational interaction comprises a feedback process.

8. A method of performing aeroelastic analyses, comprising the steps of:
   providing a mathematical model for a plurality of structural modes of a flexible structure;
   providing a nonlinear aerodynamic model for generating a plurality of unsteady aerodynamic responses based on said plurality of structural modes for conditions defining an aerodynamic condition of said flexible structure;
   generating a linear state-space model using a single execution of said nonlinear aerodynamic model for said plurality of structural modes, said single execution of said nonlinear aerodynamic model using a family of orthogonal functions as inputs thereto; and
   generating static and dynamic aeroelastic solutions using computational interaction between said mathematical model and said linear state-space model for a plurality of periodic points in time.

9. A method of performing aeroelastic analyses according to claim 8, wherein said generation of static and dynamic aeroelastic solutions comprises rigid aerodynamic offsets.

10. A method of performing aeroelastic analyses according to claim 8, further comprising the steps of:
    changing a period for said plurality of periodic points in time; and
    regenerating static and dynamic aeroelastic solutions using computational interaction between said mathematical model and said linear state-space model for said plurality of periodic points in time so-changed in terms of said period thereof.

11. A method of performing aeroelastic analyses according to claim 8, wherein said family of orthogonal functions is selected from the group consisting of block pulse functions, Haar functions, and Walsh functions.

12. A method of performing aeroelastic analyses according to claim 8, wherein said nonlinear aerodynamic model is a computational fluid dynamics code.

13. A method of performing aeroelastic analyses according to claim 8, wherein said computational interaction comprises a feedback process.

14. A method of performing aeroelastic analyses, comprising the steps of:
providing a mathematical model for a plurality of structural modes of a flexible structure;
providing a nonlinear aerodynamic model for generating a plurality of unsteady aerodynamic responses based on said plurality of structural modes for conditions defining an aerodynamic condition of said flexible structure;
performing a single execution of said nonlinear aerodynamic model for said plurality of structural modes using a family of orthogonal functions as inputs thereto, wherein said family of orthogonal functions is selected from the group consisting of block pulse functions, Haar functions, and Walsh functions;
converting said plurality of unsteady aerodynamic responses generated during said step of performing to a linear state-space model;
generating static and dynamic aeroelastic solutions using computational feedback interaction between said mathematical model and said linear state-space model for a plurality of periodic points in time;
changing a period for said plurality of periodic points in time; and
regenerating static and dynamic aeroelastic solutions using computational feedback interaction between said mathematical model and said linear state-space model for said plurality of periodic points in time so-changed in terms of said period thereof.

15. A method of performing aeroelastic analyses according to claim 14, wherein said generation and regeneration of static and dynamic aeroelastic solutions comprises rigid aerodynamic offsets.

16. A method of performing aeroelastic analyses according to claim 14, wherein said nonlinear aerodynamic model is a computational fluid dynamics code.

17. A method of performing aeroelastic analyses according to claim 14, wherein said step of converting is performed using an Eigensystem Realization Algorithm.

18. A method of performing aeroelastic analyses, comprising the steps of:
providing a mathematical model for a plurality of structural modes of a flexible structure;
providing a nonlinear aerodynamic model for generating a plurality of unsteady aerodynamic responses based on said plurality of structural modes for conditions defining an aerodynamic condition of said flexible structure;
generating a linear state-space model using a single execution of said nonlinear aerodynamic model for said plurality of structural modes, said single execution of said nonlinear aerodynamic model using a family of orthogonal functions as inputs thereto, wherein said family of orthogonal functions is selected from the group consisting of block pulse functions, Haar functions, and Walsh functions;
generating static and dynamic aeroelastic solutions using computational feedback interaction between said mathematical model and said linear state-space model for a plurality of periodic points in time;
changing a period for said plurality of periodic points in time; and
regenerating static and dynamic aeroelastic solutions using computational feedback interaction between said mathematical model and said linear state-space model for said plurality of periodic points in time so-changed in terms of said period thereof.

19. A method of perfoming aeroelastic analyses according to claim 18, wherein said generation and regeneration of static and dynamic aeroelastic solutions comprises rigid aerodynamic offsets.

20. A method of performing aeroelastic analyses according to claim 18, wherein said nonlinear aerodynamic model is a computational fluid dynamics code.

21. A method of performing aeroelastic analyses, comprising the steps of:
providing a state-space mathematical model for a plurality of structural modes of a flexible structure;
providing a nonlinear aerodynamic model for generating a plurality of unsteady aerodynamic responses based on said plurality of structural modes for conditions defining an aerodynamic condition of said flexible structure;
performing a single execution of said nonlinear aerodynamic model for said plurality of structural modes using a family of orthogonal functions as inputs thereto;
converting said plurality of unsteady aerodynamic responses generated during said step of performing to a linear state-space model; and
generating state-space static and dynamic aeroelastic solutions using computational interaction between said state-space mathematical model and said linear state-space model for a plurality of periodic points in time.

22. A method of performing aeroelastic analyses according to claim 21, wherein said generation of state-space static and dynamic aeroelastic solutions comprises rigid aerodynamic offsets.

23. A method of performing aeroelastic analyses according to claim 21, further comprising the steps of:
changing a period for said plurality of periodic points in time; and
regenerating state-space static and dynamic aeroelastic solutions using computational interaction between said state-space mathematical model and said linear state-space model for said plurality of periodic points in time so-changed in terms of said period thereof.

24. A method of performing aeroelastic analyses according to claim 21, wherein said family of orthogonal functions is selected from the group consisting of block pulse functions, Haar functions, and Walsh functions.

25. A method of performing aeroelastic analyses according to claim 21, wherein said nonlinear aerodynamic model is a computational fluid dynamics code.

26. A method of performing aeroelastic analyses according to claim 21, wherein said step of converting is performed using an Eigensystem Realization Algorithm.

27. A method of performing aeroelastic analyses according to claim 21, wherein said computational interaction comprises a feedback process.

* * * * *